July 4, 1950 W. B. LYON 2,513,502
CONVEYER MECHANISM
Filed Aug. 29, 1945 7 Sheets-Sheet 1

Inventor
WILLIAM B. LYON
By Rice and Rice
Attorneys

WITNESS
Lennie L. Parker

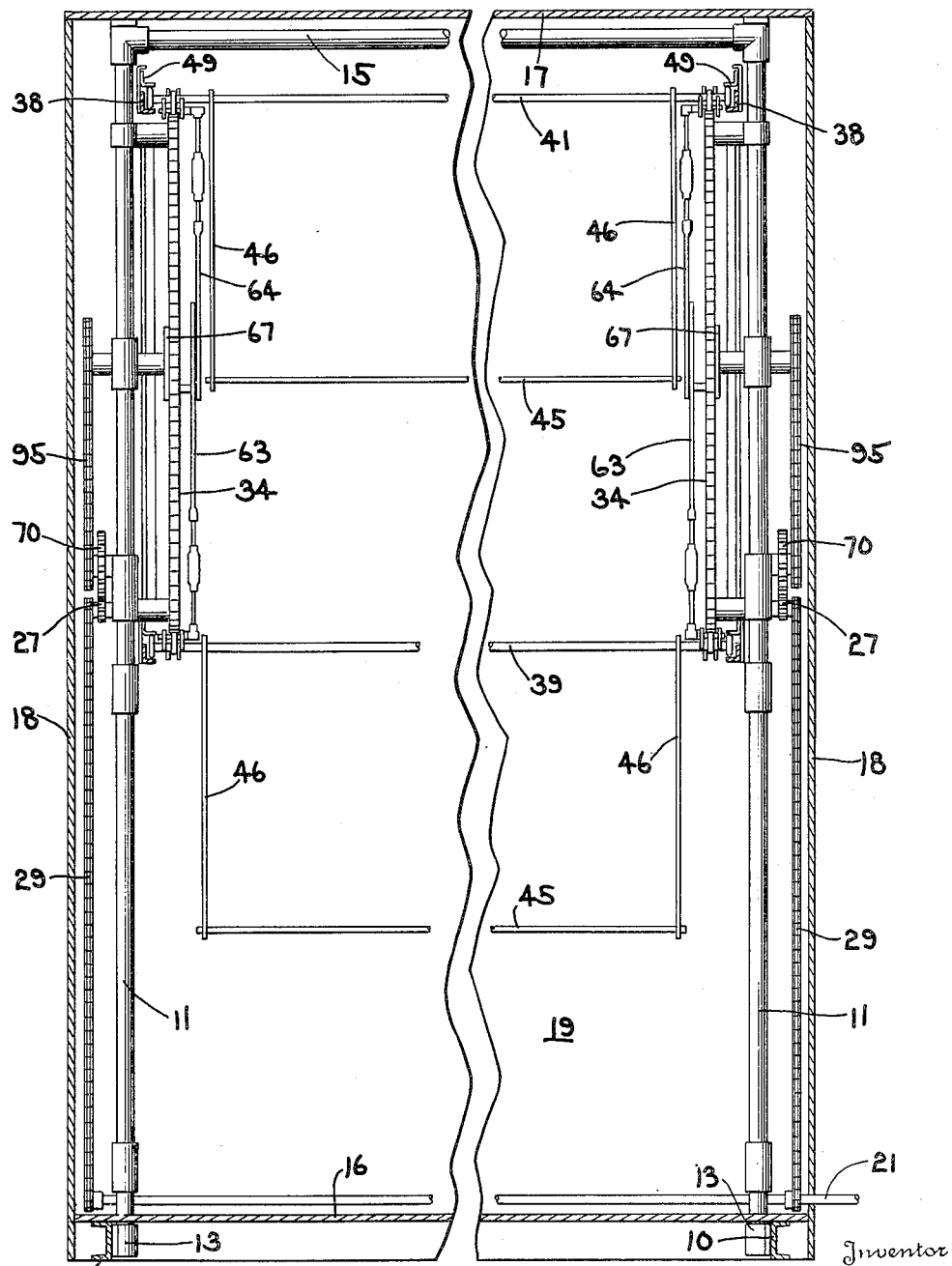

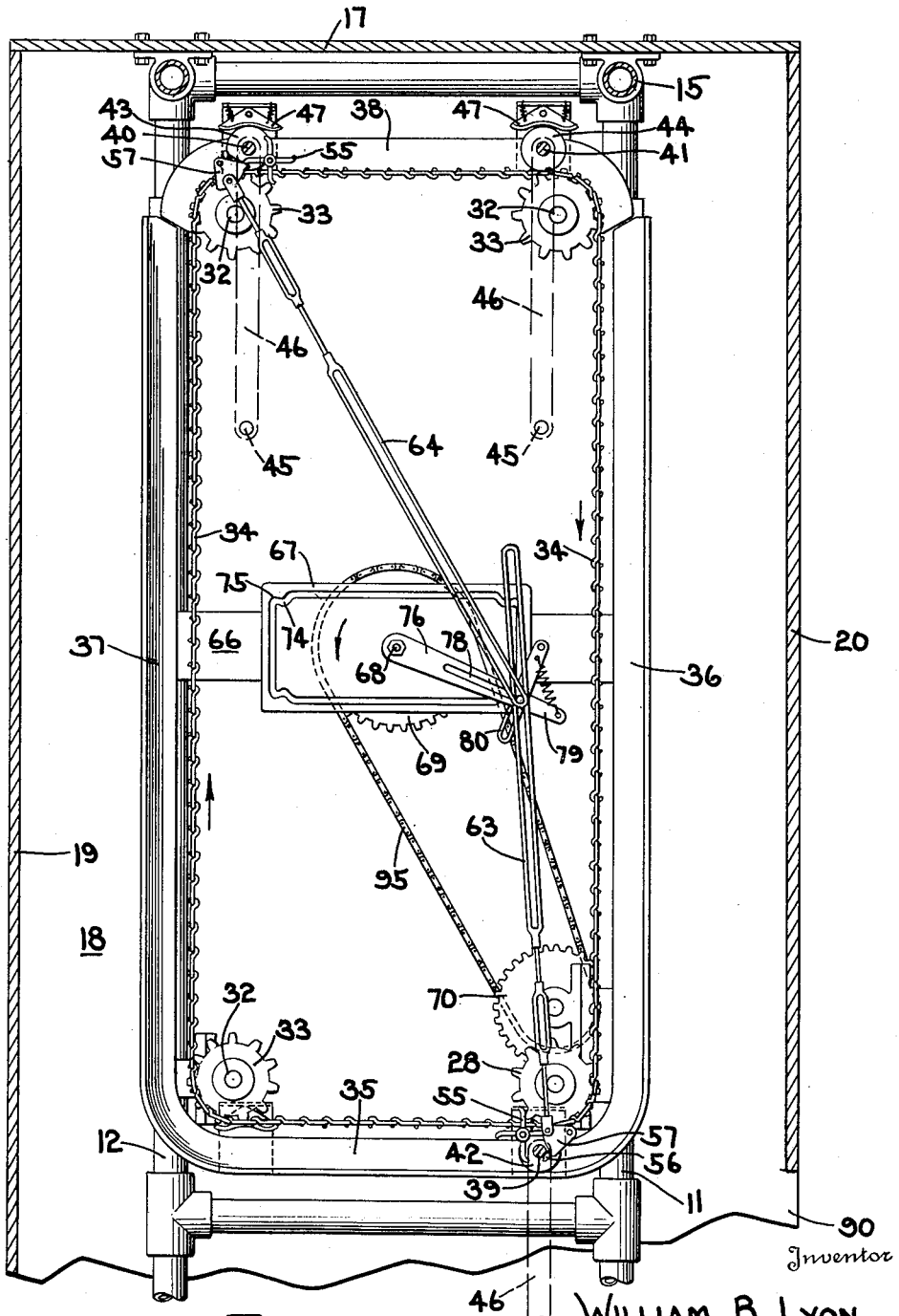

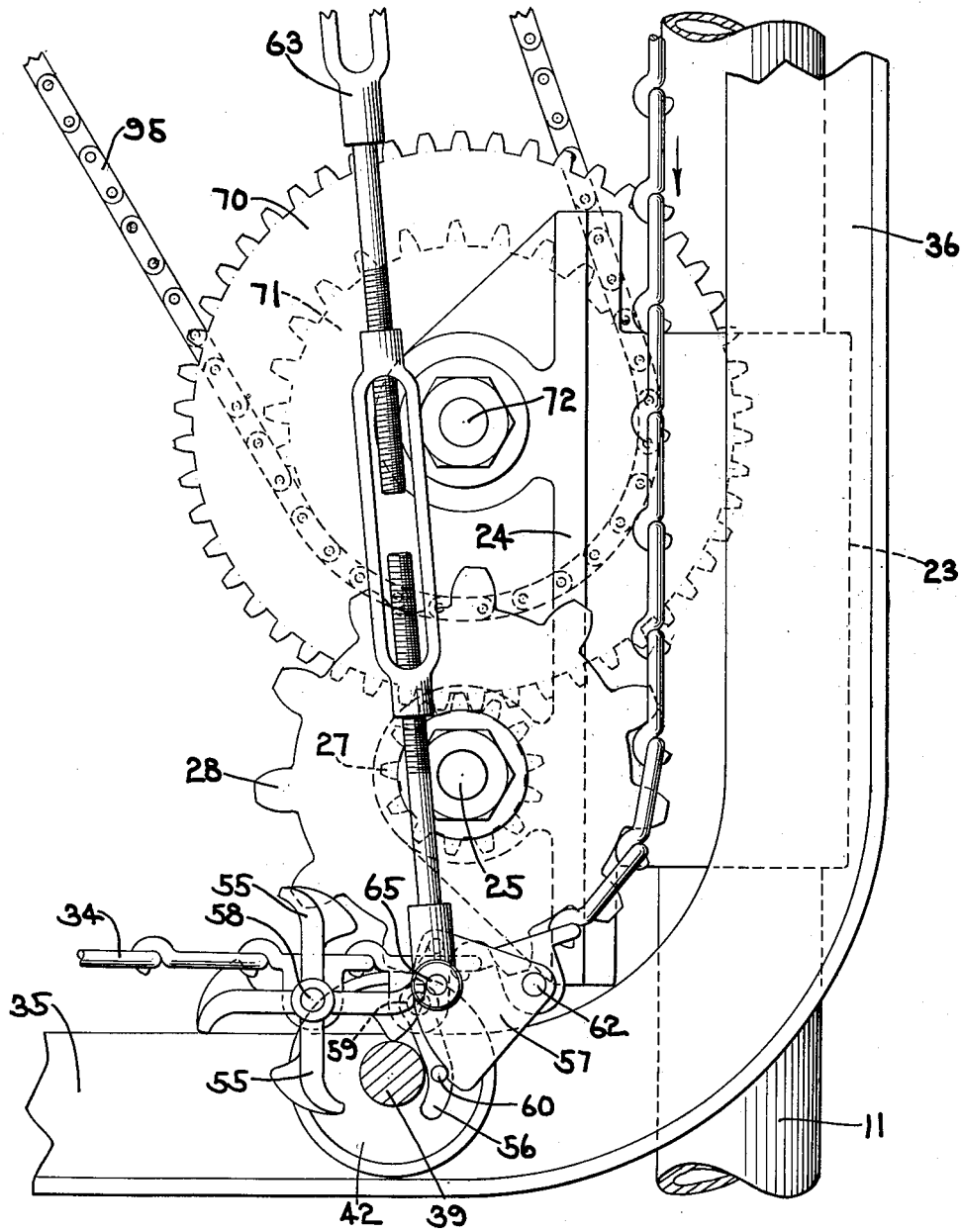

July 4, 1950   W. B. LYON   2,513,502
CONVEYER MECHANISM
Filed Aug. 29, 1945   7 Sheets-Sheet 5

Inventor
WILLIAM B. LYON
By Rice and Rice
Attorneys

WITNESS:
Lennie L. Parker

Inventor
WILLIAM B. LYON
By Rice and Rice
Attorneys

July 4, 1950  W. B. LYON  2,513,502
CONVEYER MECHANISM

Filed Aug. 29, 1945  7 Sheets-Sheet 7

WITNESS
Lennie L. Parker

INVENTOR.
WILLIAM B. LYON
BY Rice and Rice
ATTORNEYS

Patented July 4, 1950

2,513,502

UNITED STATES PATENT OFFICE 2,513,502

CONVEYER MECHANISM

William B. Lyon, Detroit, Mich.

Application August 29, 1945, Serial No. 613,294

16 Claims. (Cl. 312—99.5)

This invention relates to display cases and more particularly to a conveyor mechanism for display cases having various appearing and disappearing displays therein.

In stores or merchandise markets it is desirable to conserve floor space and to display as much merchandise as possible within a given space. Many stores have unutilized space above the level of the top of an ordinary display case or between the top of the usual display case and the ceiling. It is also desirable in some stores that the merchandise be stored in as small a space as possible and that the merchandise be easily available. Also in factories the small tools in the tool crib should be stored so that they are easily accessible.

It is the primary purpose of the present invention to provide a conveyor mechanism for a display case or the like within which various groups of merchandise are alternately displayed and in such a manner that the minimum amount of floor space is utilized for the display of a given quantity of merchandise.

Another purpose of the invention is to provide a conveyor mechanism for display case which utilizes the space between the top of an ordinary case and the ceiling for the storage of undisplayed merchandise while other merchandise is being displayed.

Another purpose of this invention is to provide means whereby changing from the accessibility of one group of merchandise to the accessibility of another group is easily and conveniently accomplished. A still further purpose of the present invention is to provide a conveyor mechanism in which merchandise or tools or the like may be stored in a relatively small space and are easily movable to make them accessible.

An illustrative embodiment of the invention is shown in the accompanying drawings, in which:

Fig. 2 is a longitudinal vertical section through the display case;

Fig. 3 is a vertical lateral section through the upper portion of the display case;

Fig. 4 is a fragmentary enlarged side elevational view of a portion of the driving mechanism and the latching mechanism for the merchandise rods showing one of the rods latched to the conveyor;

Figure 1:
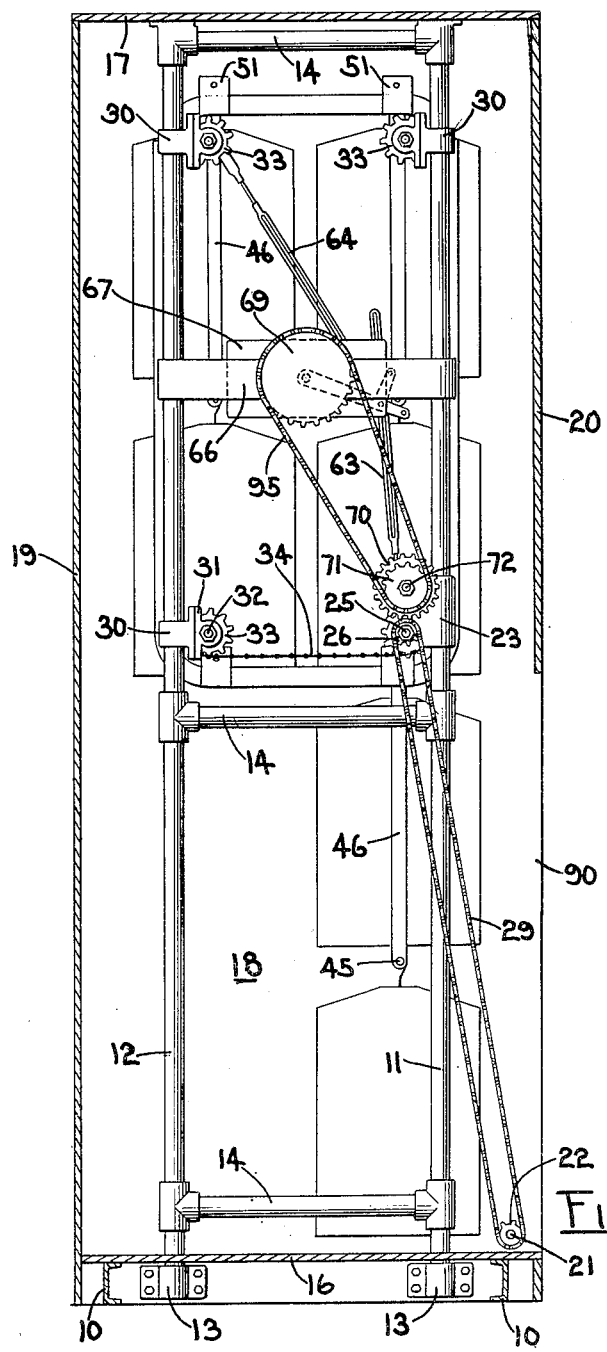
Fig. 1 is a vertical lateral section through a display case showing one group of merchandise being displayed while other groups are stored out of sight.
Figure 9:
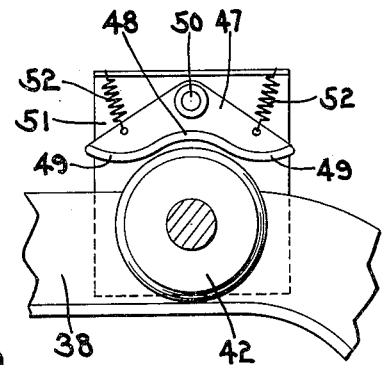
Fig. 9 is a view of one of the detents which yieldably hold the rods in their proper locations while unlatched from the chain.
Figure 22:
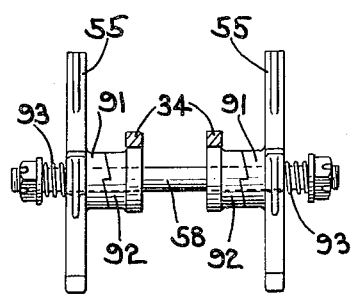

Figs. 10 to 21, inclusive, diagrammatically show the various locations of the cam, latch links and merchandise rods through one complete cycle; and Fig. 22 is a sectional view of the star wheel and supporting link showing the means for nonrotation in one direction.

Referring to the drawings in which like parts of the mechanism are designated by the same numerals in the several views, the display case has a horizontal base member 10 to which is attached the vertical frame members 11 and 12 by means of the brackets 13. These vertical frame members 11 and 12 are held in spaced relationship by the horizontal frame members 14 and the two end frame members consisting of members 11, 12 and 13 are spaced lengthwise of the case by the frame members 15.

A cabinet is built around this framework consisting of a bottom panel 16, top panel 17, end panels 18, back panel 19 and front panel 20. The bottom panel 16 rests on and is secured to the horizontal frame 10 and the top panel 17 is secured to the upper side of the framework. The end panels 18 are secured to the bottom and top panels and are spaced from the framework at the ends of the display case. The back panel 19 is provided to close the back of the case and the front panel 20 closes the upper portion of the cabinet leaving a front display opening 90 through which the merchandise is displayed. The top of this opening is approximately as high as the average display case.

In describing the mechanism for changing the display in the case, one end only of the mechanism will be described as the mechanisms at both ends are identical.

A drive shaft 21, provided with suitable means, not shown, for rotating the same, is rotatably mounted in the case and has a sprocket 22 secured thereto. A block 23 secured to frame member 11 has adjustably attached thereto by any suitable means, as bolts and nuts (not shown), the double bearing member 24 and a shaft 25 rotatably mounted in the bearing member 24 has secured thereto a sprocket 26, gear 27 and sprocket 28. A chain 29 extends around and between sprockets 22 and 26 for transmission of the drive.

Blocks 30 are secured to the vertical frame members 11 and 12, there being two of said blocks attached to each of the frame members 12, and one of said blocks secured to each of the frame members 11. These blocks 30 have bearing members 31 adjustably attached thereto by any suitable means, as bolts and nuts (not shown). Shafts 32 are rotatably mounted in said bearing members, and sprockets 33 are secured to each of the shafts 32. The endless conveyor chain 34 is trained over the sprocket 28 and sprockets 33, said chain forming substantially a rectangle. The adjustable mounting of the bearing member 24 on the block 23, and the adjustable mountings of the bearing members 31 on the blocks 30, provide for the ready adjustment of the sprocket 28 and sprockets 33 for the proper engagement of the same with the endless conveyor chain 34.

A track is mounted on the vertical framework members 11 and 12 and has a lower horizontal portion 35, a front vertical portion 36, a rear vertical portion 37 and a top horizontal portion 38. The track portions 35, 36 and 37 are a single track of angle cross section with the lower and outer legs thereof extending inwardly while the upper horizontal track portion 38 is of angle cross section and has its lower leg extending inwardly.

Merchandise supporting hang rods 39, 40 and 41 having rollers 42, 43 and 44 formed a part thereof are adapted to be guided by the track to their various stations. Other merchandise supporting hang rods 45 are dependent from each of the rods 39, 40 and 41 by means of the straps 46 which are adapted to receive merchandise, such as coats, dresses, suits or the like hung by hangers hooked over these rods.

Detent members 47 are provided to locate and hold the hang rods at their various locations and are each formed with a central outwardly curved portion 48 and inwardly curved portions 49 at each end. The detent members 47 are pivoted at 50 to plates 51, which plates are attached to the track members and springs 52 tend to hold each detent member in its normal horizontal position. As one of the rollers 42, 43 or 44 approaches the detent member, the roller moves under curved portion 49, moving it upwardly and on further motion, moves under the central curved portion 48 whereupon the spring members move the detent to normal position thereby yieldably holding the roller at that particular station.

Latching mechanisms are provided at diametrically opposite locations on the chain 34 which latching mechanisms are for the purpose of moving the mechandise supporting rods 39, 40 and 41 to their proper respective locations for displaying and storing the merchandise. These latching mechanisms each comprise star wheels 55, driving dog 56 and cams 57. The star wheels are rotatably mounted on pin 58 on one link of the chain 34 and the ratchet hub 91, see Fig. 22, is secured to the star wheel. The ratchet hub 92 is mounted on the chain link and the tension springs 93 yieldably hold the ratchet hubs in engagement with the ratchet wheel whereby the star wheel will rotate in a counterclockwise direction only.

Figure 5:
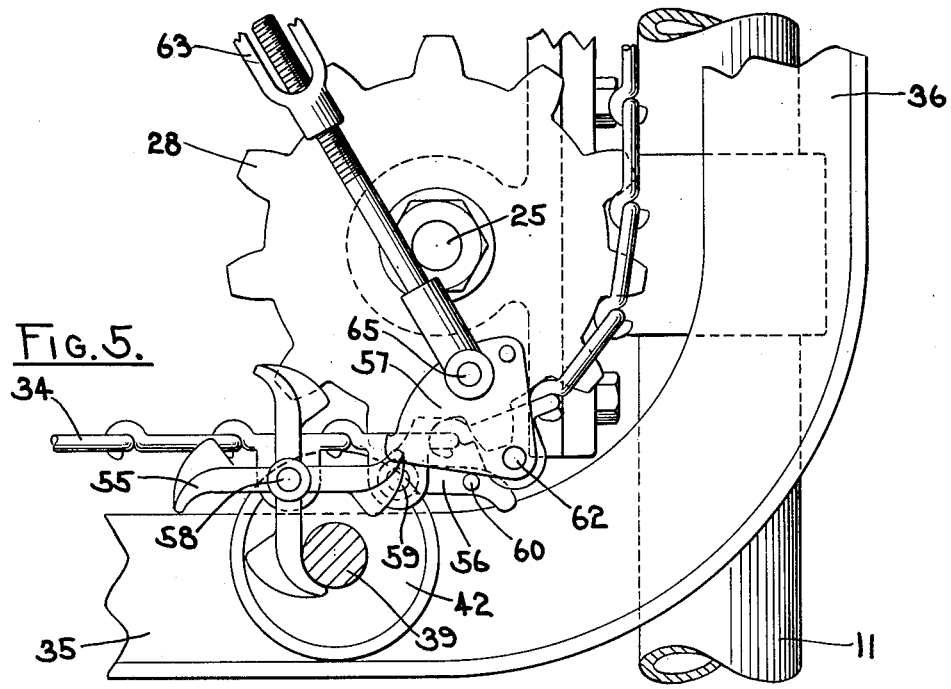
Fig. 5 is a fragmentary enlarged elevational view similar to Fig. 4 but showing the merchandise rod unlatched from the conveyor.
Figure 6:
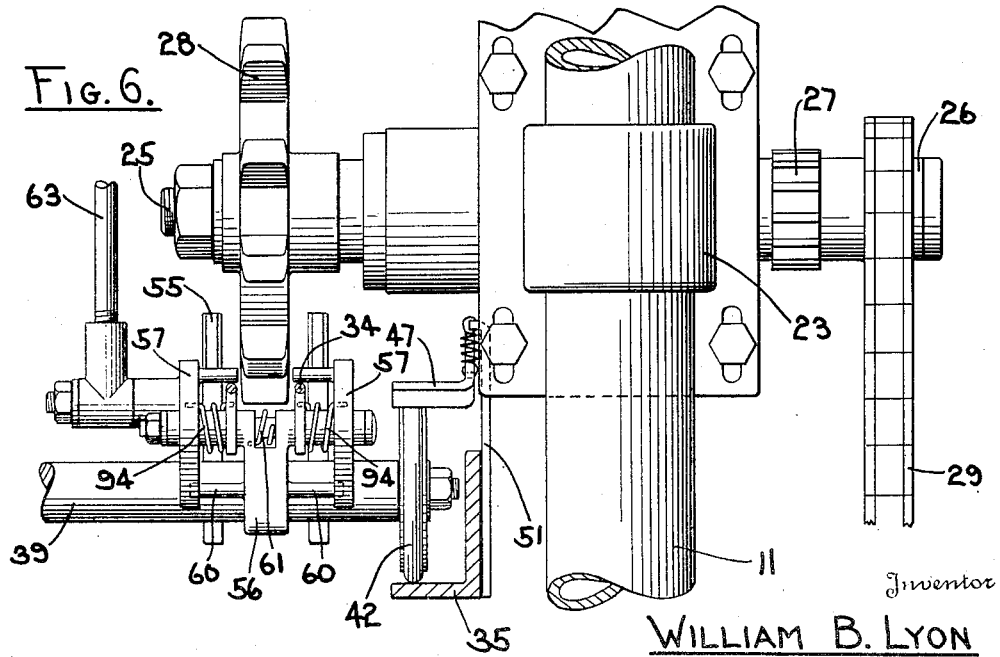
Fig. 6 is a front elevation of a portion of the mechanism as shown in Fig. 4.
Figure 7:
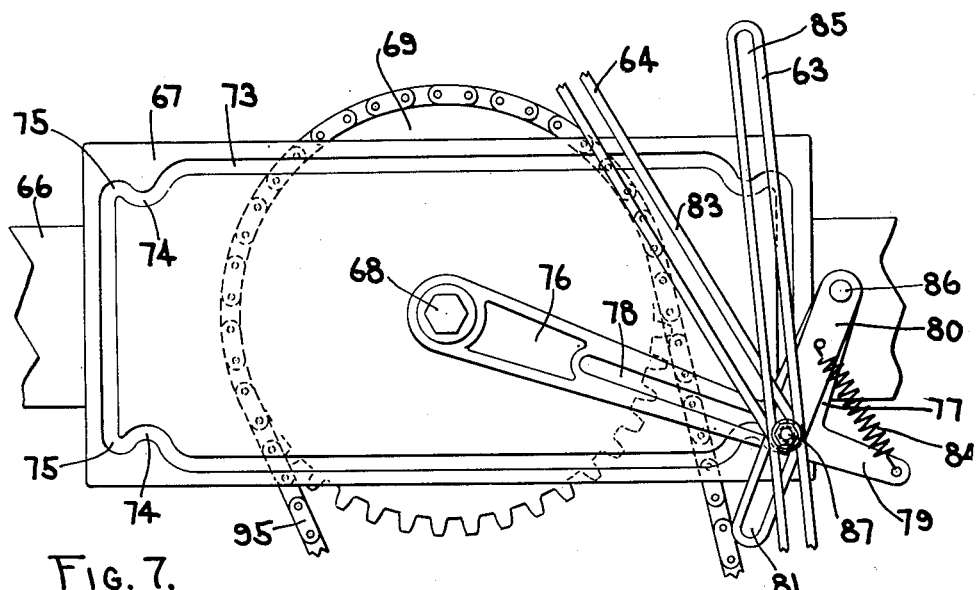
Fig. 7 is an elevational view of the cam plate and the latch links operated thereby.
Figure 8:
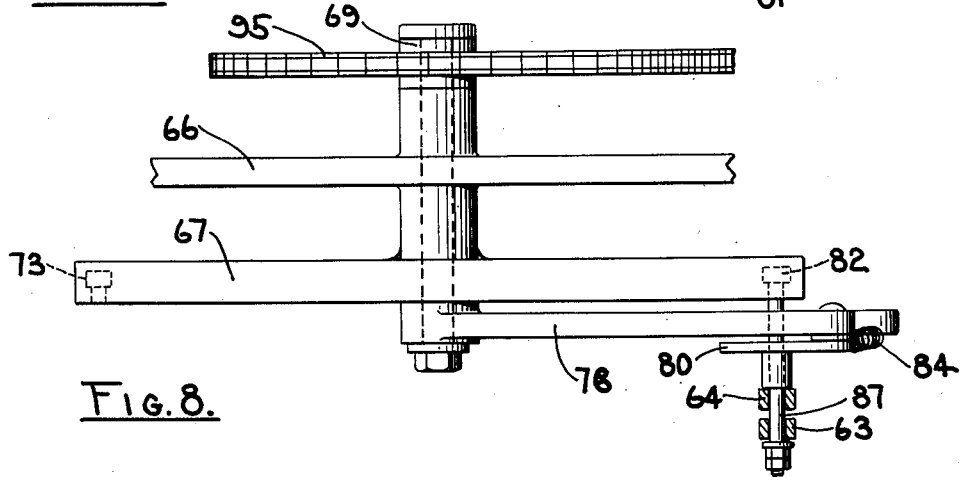
Fig. 8 is a plan view of the parts shown in Fig. 7.

The driving dog 56, pivotally mounted at 59 on the following link of the chain, has pins 60 extending on both sides thereof and a torsion spring 61 tends to move the dog to unlatched position against the cam 57. The cam plates 57 are pivotally mounted at 62 on the next following link of the chain and are movable to allow the dog to move to unlatched position as shown in Fig. 5 or is movable to hold the dog 56 in latched position as shown in Fig. 4 so that the merchandise holding rods must follow the chain 34 while the dog is latched.

The torsion springs 94 yieldably move cam plates 57 in a counterclockwise direction whereby said cam plates normally hold the dog 56 in latched position to move one of the merchandise supporting rods with the conveyor chain.

Means are provided for moving the cams 57 and dogs 56 to unlatched position. Links 63 and 64 are pivotally connected at 65 to the outer free end of each of the cams 57 and the links are provided with a turnbuckle so that their lengths may be adjusted. A bearing member 66 is attached to and extends between the vertical frame members 11 and 12 and a cam plate 67 is rigidly mounted on the bearing member 66. Shaft 68 is freely rotatable in bearing member 66, to which is secured the sprocket 69. The forementioned bearing member 24 receives the freely rotatable shaft 72 to which is secured the gear 70 and the sprocket 71. Gear 70 meshes with gear 27 and a sprocket chain 95 passes over sprockets 69 and 71.

The cam plate 67 is provided with a cam groove 73 formed therein which is substantially rectangular in form and at its corners, the grooves are provided with depressions 74 and swells 75. The lever 76 is mounted to rotate with the cam shaft 68 and has a right angle arm 77, longitudinal slot 78 and outer extension 79. A lever 80, longitudinally slotted at 81 at its outer end, is pivotally connected at 86 to the outer end of arm 77 and a cam follower 82 is adapted to follow the cam groove 73, the shank 87 of which passes through slot 78 of lever 76, through slot 81 of lever 80 and slots 85 and 83 of links 63 and 64. A spring 84 is attached intermediately of lever 80 and to the outer extension 79 of lever 76 which spring tends to move the cam follower shank to the outer end of slot 78 in lever 76.

It will be seen that when the links 63 and 64 are free to move endwise, the cams 57 will be in the position as shown in Fig. 4 holding the latch dog 56 in latched position behind the merchandise supporting rod, the torsion spring 94 yieldably holding the cam, link and dog in this position. When an endwise pull is exerted on links 63 and 64, the cams 57 are moved to position shown in Fig. 5 in which position the torsion spring 61 moves the latch dog 56 to unlatched position. Such endwise pull on either of the links 63 or 64 occurs whenever the cam follower is moved by lever 76 into the cam groove swell 75 and is diagonally opposite the location of the latch mechanism at one of the stations.

*Operation*

In operation, when it is desired to shift the merchandise on display, the shaft 21 is caused to be rotated whereby the chain 34 is moved in the direction of the arrows over sprockets 28 and 33 by means of the sprockets 21 and 26 and chain 29. The merchandise on display will thus be moved to the back and the merchandise above will be moved down for display.

Whenever a latching mechanism is latched over a merchandise hang rod it will be moved with the conveyor chain but when unlatched, the hang rod will remain stationary and will be yieldably held at one of the four stations by one of the detent members 47. This unlatching of the hang rod from the conveyor chain takes place only at one of the four stations adjacent the detent members which is accomplished by having the lever 76 rotate in the direction opposite the direction of the movement of the chain 34 as shown by the arrows in Fig. 3. This action is effected by the gears 27 and 70, sprockets 71 and 69 and chain 95 rotating the lever 76. The lever 76 is timed with the chain so that a pull on the links, to open the latch, can only be exerted when the latching mechanism and the hang rod reach one of the four stations, or when the cam follower moves into the swell 75 of the cam groove.

Figure 10:
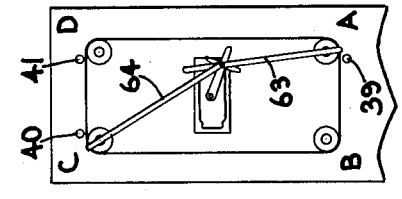
Figure 16:
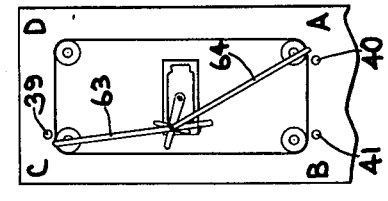

This timing of the movement of the chain and the rotation of the lever causes the changing of the merchandise in the case to follow a certain sequence which is shown in Figs. 10 to 21, inclusive, and is as follows:

In these figures the four stations are designated as A, B, C and D and in Fig. 10, the rod 39 is at station A and is latched to the chain, station B is empty, rod 40 has been brought to station C and is unlatched from the chain as a pull is exerted on link 64 since the cam follower has moved into the cam groove swell 75. As a pull is exerted on the link 64, it, in turn, exerts an endwise pull on cam 57 to release dog 56 and rod 40 when lever 76 has rotated to position cam follower 82 at the outermost end of slot 83. Rod 41 is free of the chain and is held at the station D by the detent 47.

Figure 11:
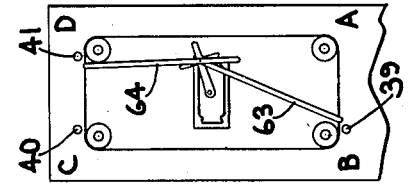

In moving from the position shown in Fig. 10 to the position shown in Fig. 11, the link 63 moves from station A to station B, moving the rod 39 with it. When link 63 reaches station B, it causes the rod 39 to become unlatched from the chain. Link 64 moves from station C to station D, having left rod 40 at station C and on reaching station D, the rod 41 is latched on to the chain 34.

Figure 12:
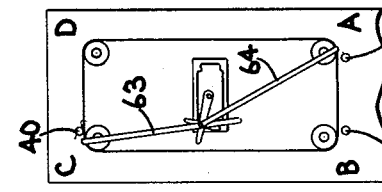
Figure 18:
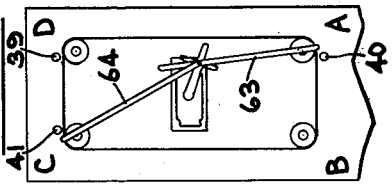

In moving from its position in Fig. 11 to its position in Fig. 12, the link 63 moves from station B to station C leaving rod 39 at station B and latching on to rod 40 at station C. Link 64 moves from station D to station A moving rod 41 along to station A and rod 41 becomes unlatched from the chain 34 as it reaches station A.

Figure 15:
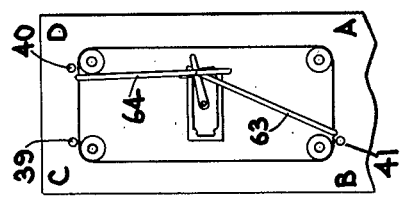
Figure 21:
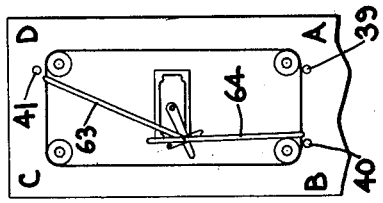
Figure 14:
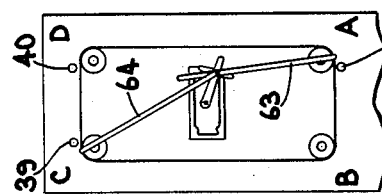
Figure 20:
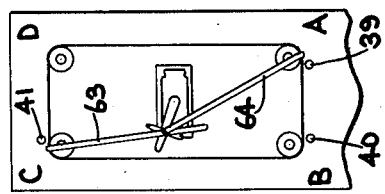
Figure 13:
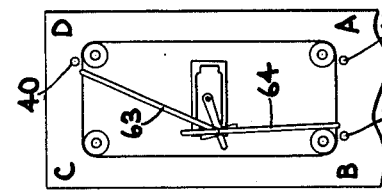
Figure 19:
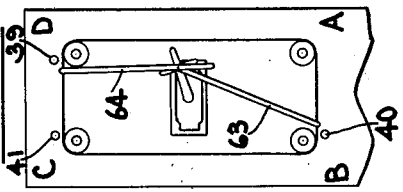
Figure 17:
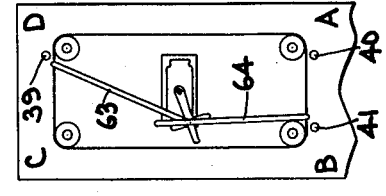

In Fig. 13, rod 40 has moved to station D and in Fig. 14, rod 39 has moved to station C. In Fig. 15, rod 41 has moved to station B and in Fig. 16, rod 40 has moved to station A. In Fig. 17, rod 39 has moved to station D and in Fig. 18, rod 41 has moved to station C. In Fig. 19, rod 40 has moved to station B and in Fig. 20, rod 39 has moved to station A. In Fig. 21, rod 41 has moved to station D and the next position is that shown in Fig. 10 with rod 40 moved to station C. This completes a cycle of operation and the cycle may thus be stopped in display position for the display of any group of merchandise.

Thus I have invented a conveyor mechanism for a display case in which a number of groups of merchandise may be placed, any one of which may be displayed or made accessible in the display opening of the case in such a way that a minimum amount of floor space is used for display purposes.

Having thus described my invention, it will be understood that certain details of the construction shown may be altered or omitted without departing from the spirit of the invention as the same is defined in the following claims.

I claim:

1. A display case comprising a cabinet having a display opening and storage spaces, merchandise supports mounted in the cabinet movable from the storage spaces to the display opening and from the latter back to the storage spaces, conveyor means in the cabinet, means for selectively moving the conveyor to the display opening and storage spaces, latching means on the conveyor for latching the supports to the conveyor, means for periodically unlatching the supports from the conveyor at said different locations, and means for supporting the merchandise supports when unlatched from the conveyor.

2. A display case comprising a cabinet having a display opening and storage spaces, merchandise supports movably mounted in said cabinet, conveyor means in said cabinet for moving said supports, means for moving said conveyor to the storage spaces and forwardly of the display opening, latching means on said conveyor for latching the supports thereto, means for periodically unlatching said latching means from the supports, said last mentioned means including rotatable lever means in said cabinet, means for operating said lever means, link members extending between the latching means and said lever means.

3. A display case comprising a cabinet having a display opening and storage spaces, track members disposed within said cabinet, merchandise supporting members mounted on said track members to move to said display opening and to said storage spaces, conveyor means mounted in said cabinet for moving said members, means for moving said conveyor, latch means on said conveyor for latching said members to said conveyor, lever means rotatably mounted in said cabinet, means for rotating said lever means, cam means provided with spaced depressions, a cam follower coacting with the cam means and having a pivotal sliding connection with said lever means and link members extending between said cam follower and said latch means.

4. A display case comprising a cabinet having a display opening and a rear storage space and upper storage spaces, track members disposed within said cabinet, merchandise supporting members mounted on said track members movable alternately to the display opening, rear storage space and upper storage spaces, conveyor means movably mounted in said cabinet for moving said members, means for moving said conveyor, latching means on said conveyor adapted to latch to said merchandise supporting members, cam means mounted in said cabinet provided with a depression, link members slotted for a portion of their length and extending between the latching means and said cam means, a cam follower coacting with said cam means and disposed within the slot of each link member, and means for moving the cam follower along the cam.

5. A display case comprising a cabinet having a front lower display opening, a rear storage space, an upper rear storage space and an upper front storage space, track members mounted in said cabinet, merchandise supporting members movably mounted on said tracks guided to the display opening, to the rear storage space, to the upper rear storage space, to the upper front storage space and back to the display opening, said track members being adapted to support said merchandise supporting members at said different locations, a conveyor movably mounted in said cabinet for moving said supporting members, means for moving said conveyor, latching means on said conveyor for latching said supporting members to said conveyor, and means for periodically unlatching the latching means on the movement of the conveyor.

6. A display case comprising a cabinet having a display opening and a plurality of storage spaces, track members mounted in said cabinet, merchandise supports movably mounted on said track members, said track members located to guide said merchandise supports to the display opening and to the storage spaces, a conveyor movably mounted adjacent said track for moving said supporting members, means for moving said conveyor, latching means on said conveyor for latching the merchandise supporting members to the conveyor when said latching means abut said supports, link members each slotted for a portion of its length and secured to said latching means, a cam mounted in the cabinet, said cam being provided with a cam groove, said cam groove having a swell therein, a cam follower received in said cam groove and in the slot of each of said link members, and means for causing the cam follower to move along the cam groove.

7. A display case comprising a cabinet having a display opening and a plurality of storage spaces, track members mounted in said cabinet, merchandise supporting rods movably supported on said tracks, said track members located to guide the merchandise supporting rods to the display opening and to the storage spaces, a conveyor movably mounted adjacent said tracks for moving said rods, means for moving said conveyor, latching means supported on said conveyor, said latching means comprising a star wheel and a latching dog, the legs of said star wheel extending to a position to engage said supporting rods, said star wheel being freely rotatable in one direction and non-rotatable in the opposite direction, resilient means tending to move said latching dog to unlatching position, a cam pivotally mounted on said conveyor, means for moving the cam to one position to normally hold said dog in latched position and means for moving the cam to another position to release said dog for unlatching.

8. A conveyor mechanism comprising hang rods movable to storage space and to a display position, conveyor means for moving the hang rods to the storage spaces and to the display position, means for moving said conveyor, latching means on said conveyor for latching the hang rods to the conveyor, means for periodically unlatching said latching means from the hang rods, including rotatable lever means, means for operating said lever means, stationary cam means, a cam follower coacting with said cam means connected with said lever means, and link members extending between the latching means and cam follower.

9. A conveyor mechanism comprising track members, hang rods movable on said tracks to storage position and to a display position, conveyor means for moving the hang rods movably mounted adjacent the tracks, means for moving the conveyor, means for latching the hang rods to the conveyor, stationary cam means provided with spaced depressions, a rotatably mounted lever means, means for rotating the lever, link members extending between said lever means and said latch means, and means on said lever for moving the link members along the cam means, whereby upon movement of the conveyor and rotation of the lever means, the link members periodically unlatch the latch means.

10. A conveyor mechanism comprising track members, hang rods movable on the tracks to storage positions and to a display position, conveyor means movably mounted adjacent the tracks for moving the hang rods, means for moving the conveyor, latching means on the conveyor normally latched to the hang rods, stationary cam means provided with spaced depressions, a rotatably mounted lever means, means to rotate the lever, link members slotted for a portion of their length extending between the latching means and the cam means, a cam follower coacting with the cam means and moved therealong by said lever means and disposed within the slot of the link.

11. A conveyor mechanism comprising track members, hang rods movably mounted on the tracks to storage positions and to a display position, conveyor means movably mounted adjacent the tracks for moving the hang rods, means for moving the conveyor, latching means on the conveyor for latching the hang rods to the conveyor when the latching means abut the hang rod, link means secured to the latching means, cam means provided with a groove having spaced swells therein, a cam follower received in the cam groove and in the link, and means to move the cam follower along the groove of the cam.

12. A conveyor mechanism comprising track members, hang rods mounted on the track movable to storage position and to a display position, conveyor means movably mounted adjacent the track for moving the hang rods, means for moving the conveyor, latching means secured to the conveyor comprising a star wheel, a latch dog and a latch cam, the star wheel extending to a position to engage a hang rod and being freely rotatable in one direction to allow the star wheel to move past the hang rod, the star wheel being nonrotatable in the opposite direction whereby the hang rod may be supported thereon, the latching dog normally being held yieldably in unlatched position from the hang rod, the latch cam pivotally mounted on the conveyor being held yieldably in position to hold the latch dog in latched position and movable to position to release the dog whereby the dog will move to unlatched position, a link member provided with a slot anchored to the latch cam, a cam plate having a cam groove provided with spaced swells, a cam follower received in the cam groove and the slot of the link, and means for moving the cam follower along the cam groove.

13. A display case comprising a cabinet having a display opening and storage spaces, a plurality of merchandise supports, means within said cabinet providing a mounting for said supports for movement of the same from the storage spaces to said display opening and from the latter back to the storage spaces and supporting said supports at said different locations, conveyor means in the cabinet for moving said supports from the storage spaces to said opening and from the latter back to the storage spaces, means for selectively moving the conveyor means, latching means on the conveyor for latching said supports thereto, means for periodically unlatching the supports from the conveyor at said different locations, and means for operating said unlatching means.

14. A display case as set forth in claim 13 but being further provided with detent means yieldably holding the merchandise supports stationary while the same are unlatched from the conveyor.

15. A display case comprising a cabinet having a display opening and storage spaces, track members mounted in said cabinet adjacent the display opening and the storage spaces, merchandise supports movably mounted on said track members, a conveyor movably mounted adjacent said tracks, means for moving said conveyor, latch means on said conveyor normally latched to said supports, means for periodically unlatching said latch means from the supports, said means including a rotatable lever, means for rotating said lever, stationary cam means provided with spaced depressions, a cam follower coacting with the cam means and having a pivotal sliding connection with said lever, and link members each having a pivotal sliding connection with the said cam follower and each pivotally connected at one end with said latch means.

16. A conveyor mechanism comprising track members, hang rods movable on said track members to storage spaces and to a display position, a conveyor movably mounted adjacent said tracks, means for moving the conveyor, latch means on said conveyor, said latch means being normally latched to the hang rods, a rotatable lever, means for rotating said lever, cam means, a cam follower coacting with the cam means having a pivotal sliding connection with said lever, and link members connected with the cam follower and the latch means for alternately unlatching the hang rods from the conveyor.

WILLIAM B. LYON.

REFERENCES CITED

The following references are of record in the file of this patent:

UNITED STATES PATENTS

| Number | Name | Date |
| --- | --- | --- |
| 934,890 | Davidson | Sept. 21, 1909 |
| 971,596 | Cooper | Oct. 4, 1910 |
| 1,057,197 | Wilson | Mar. 25, 1913 |
| 1,194,210 | Mininberg | Aug. 8, 1916 |
| 1,368,533 | Aimes | Feb. 15, 1921 |
| 1,450,850 | Grip | Apr. 3, 1923 |
| 1,542,817 | Bernheim | June 23, 1925 |
| 2,155,583 | Bonnar | Apr. 25, 1939 |
| 2,253,333 | Jaeckel | Aug. 19, 1941 |
| 2,260,528 | Levy et al. | Oct. 28, 1941 |